United States Patent
Bolze et al.

(10) Patent No.: US 8,962,172 B2
(45) Date of Patent: Feb. 24, 2015

(54) BATTERY COOLING IN PARTICULAR FOR A VEHICLE BATTERY

(75) Inventors: Michael Bolze, Potsdam (DE); Christian Bragrock, Potsdam (DE); Jens Meintschel, Bernsdrof (DE); Dirk Schroeter, Winnenden (DE)

(73) Assignee: Daimler AG, Stuttgart (DE)

( * ) Notice: Subject to any disclaimer, the term of this patent is extended or adjusted under 35 U.S.C. 154(b) by 483 days.

(21) Appl. No.: 12/991,653

(22) PCT Filed: Jun. 27, 2009

(86) PCT No.: PCT/EP2009/004660
§ 371 (c)(1),
(2), (4) Date: Feb. 28, 2011

(87) PCT Pub. No.: WO2010/012341
PCT Pub. Date: Feb. 4, 2010

(65) Prior Publication Data
US 2011/0151305 A1    Jun. 23, 2011

(30) Foreign Application Priority Data

Jul. 26, 2008 (DE) .......... 10 2008 034 871

(51) Int. Cl.
*H01M 10/613* (2014.01)
*H01M 2/10* (2006.01)
*H01M 2/20* (2006.01)
*H01M 10/625* (2014.01)
*H01M 10/6554* (2014.01)
(Continued)

(52) U.S. Cl.
CPC ........ *H01M 10/5004* (2013.01); *H01M 2/1072* (2013.01); *H01M 2/1077* (2013.01); *H01M 2/1083* (2013.01); *H01M 2/206* (2013.01); *H01M 10/5016* (2013.01); *H01M 10/5053* (2013.01); *H01M 10/5079* (2013.01); *H01M 10/5095* (2013.01)
USPC .......... 429/120; 429/121; 429/123; 429/158; 429/161

(58) Field of Classification Search
USPC .......................... 429/120, 121, 123, 158, 161
See application file for complete search history.

(56) References Cited

U.S. PATENT DOCUMENTS

| 3,361,288 A * | 1/1968 | Dorman .................. 220/235 |
| 6,512,347 B1 * | 1/2003 | Hellmann et al. ........... 320/107 |
| 2002/0024751 A1 * | 2/2002 | Guttenberger ............. 359/879 |

(Continued)

FOREIGN PATENT DOCUMENTS

| DE | 88 14 571.9 U1 | 2/1989 |
| DE | 100 03 740 C1 | 6/2001 |

(Continued)

OTHER PUBLICATIONS

German Search Report including partial English language translation dated May 6, 2009 (Eight (8) pages).

(Continued)

*Primary Examiner* — Jeremiah Smith
(74) *Attorney, Agent, or Firm* — Crowell & Moring LLP

(57) ABSTRACT

A battery having a cooling apparatus for temperature control of the battery is provided. The battery has a plurality of individual cells connected in parallel and/or in series with one another using cell connectors. The individual cells are attached to the cooling apparatus such that they can be pre-stressed by means of the cell connectors.

18 Claims, 7 Drawing Sheets

Figure 1:
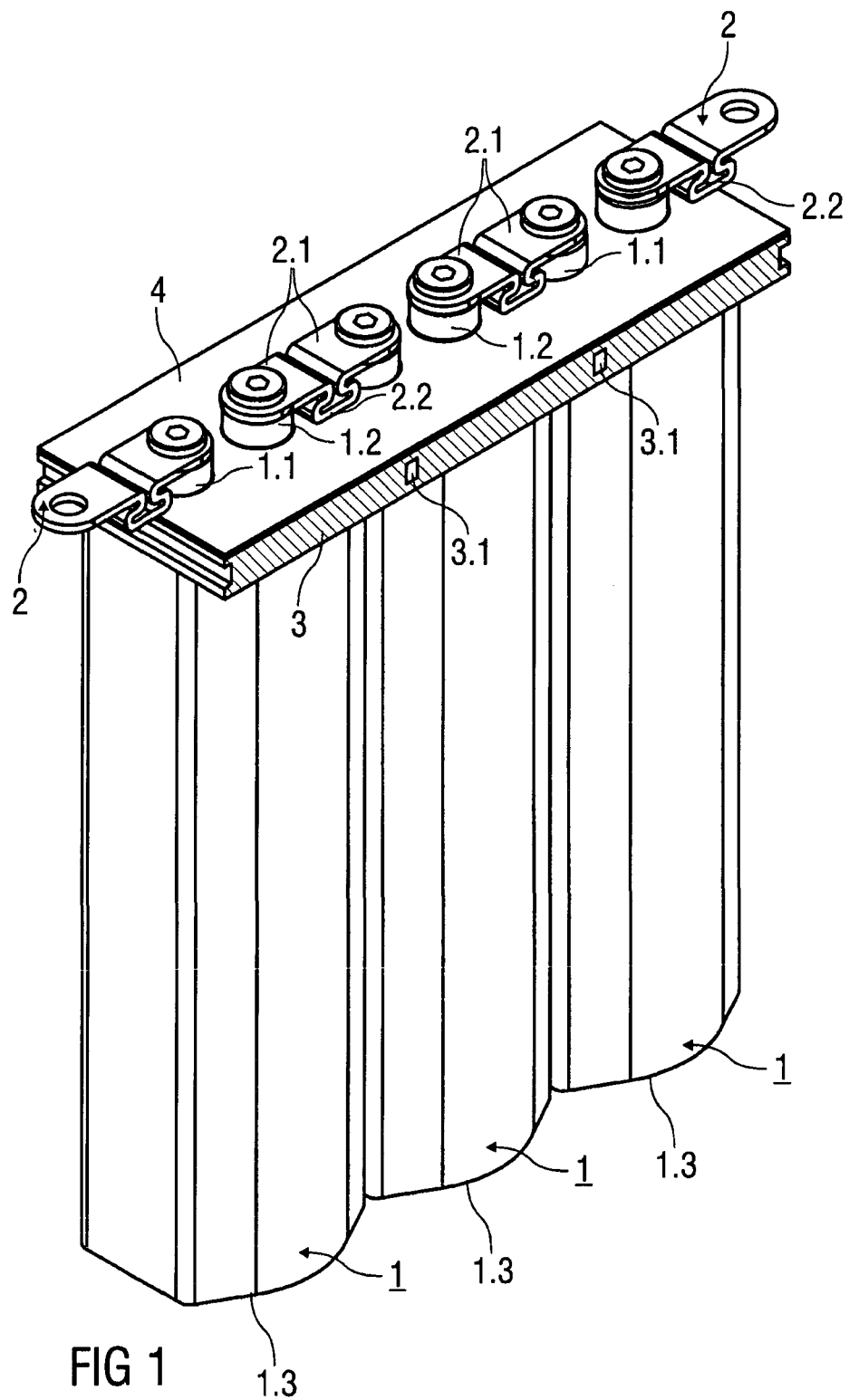

(51) Int. Cl.
*H01M 10/6569* (2014.01)
*H01M 10/663* (2014.01)

(56) References Cited

U.S. PATENT DOCUMENTS

| | | | |
|---|---|---|---|
| 2002/0142664 A1* | 10/2002 | Franklin et al. | 439/660 |
| 2005/0089750 A1 | 4/2005 | Ng et al. | |
| 2005/0174092 A1* | 8/2005 | Dougherty et al. | 320/128 |
| 2006/0094289 A1* | 5/2006 | Kim et al. | 439/500 |
| 2008/0090137 A1* | 4/2008 | Buck et al. | 429/120 |
| 2009/0111009 A1* | 4/2009 | Goesmann et al. | 429/120 |
| 2010/0104936 A1 | 4/2010 | Meintschel et al. | |

FOREIGN PATENT DOCUMENTS

| | | | |
|---|---|---|---|
| DE | 602 13 474 T2 | | 3/2007 |
| DE | 10 2006 059 989 A1 | | 6/2008 |
| DE | 102006059989 | * | 6/2008 ............ H01M 10/50 |
| DE | 10 2008 010 808 A1 | | 8/2009 |
| DE | 10 2008 010 837 A1 | | 8/2009 |
| DE | 10 2008 010 838 A1 | | 8/2009 |
| DE | 10 2008 010 839 A1 | | 8/2009 |
| JP | 9-237617 A | | 9/1997 |
| JP | 10-125301 A | | 5/1998 |
| JP | 2002-56904 A | | 2/2002 |
| JP | 2003 151526 A | | 5/2003 |
| JP | 2008-124033 A | | 5/2008 |
| JP | 2008-204990 A | | 9/2008 |
| JP | 2009-277378 A | | 11/2009 |
| JP | 2010-519714 A | | 6/2010 |
| WO | WO 2007/084260 A2 | | 7/2007 |
| WO | WO 2008/077607 A1 | | 7/2008 |

OTHER PUBLICATIONS

International Search Report including English language translation dated Sep. 24, 2009 (Six (6) pages).
Chinese Office Action with partial English translation dated Nov. 1, 2012 (eight (8) pages).
Japanese-language Office Action dated Jun. 19, 2013 (four (4) pages).

* cited by examiner

BATTERY COOLING IN PARTICULAR FOR A VEHICLE BATTERY

CROSS REFERENCE TO RELATED APPLICATIONS

This application is a national stage of PCT International Application No. PCT/EP2009/004660, filed Jun. 27, 2009, which claims priority under 35 U.S.C. §119 to German Patent Application No. 10 2008 034 871.6, filed Jul. 26, 2008, the entire disclosures of which are herein expressly incorporated by reference.

BACKGROUND AND SUMMARY OF THE INVENTION

The invention relates to a battery with a battery housing and a cooling apparatus for temperature control of the battery, wherein the battery has a plurality of individual cells which are connected in parallel and/or in series with one another.

A battery for use in motor vehicles, in particular in motor vehicles with a hybrid drive or fuel cell vehicles usually has a cell block of a plurality of individual cells electrically connected in series and/or in parallel (also called individual cells), for example, lithium ion cells.

The individual cells have to be cooled in order to discharge the resulting lost heat. For this, a cooling apparatus is used, which is thermally connected to the individual cells.

With a so-called head cooling of the individual cells, the cooling apparatus is arranged at a pole side of the individual cells, where electrical pole contacts of the individual cells are present, which are connected to each other in pairs in an electrically conductive manner using cell connectors.

These batteries are amongst others disclosed in U.S. Pat. No. 6,512,347 B1, DE 100 03 740 C1, DE 602 13 474 T2 and US 2005/0174092 A1.

U.S. Pat. No. 6,512,347 B1 discloses a battery whose cooling apparatus is formed as a cooling tube that can carry a coolant, which tube is connected to the individual cells in a heat-conducting manner via heat-conducting plates arranged between these.

With the battery disclosed in DE 100 03 740 C1, the cooling apparatus is formed as a heat-conducting plate formed on a pole side of the individual cells, which plate is in thermal contact with cell connectors of pole contacts of the individual cells for cooling the individual cells.

With the battery disclosed in DE 602 13 474 T2, the cooling apparatus is formed as a cooling bellows of a deformable heat-conducting material. The cooling bellows is placed around the individual cells in several folds and can be flown through by a heat transfer medium, via which heat can be discharged from the individual cells.

US 2005/0174092 A1 discloses a battery whose cooling apparatus comprises a number of cooling channels. Thereby, for cooling the individual cells, pole contacts of the individual cells and cell connectors electrically connecting them are arranged in the cooling channels and can be cooled convectively using a gas flowing through the cooling channels. The cell connectors preferably have cooling blades extending into the cooling channels in order to enlarge their coolable surface. The cell connector simultaneously serve for fixing the individual cells, in that they are formed as washer elements for screw nuts for the attachment of the pole contacts to walls of the cooling channels.

The present invention provides a battery with improved cooling of the individual cells.

In accordance with exemplary embodiments of the present invention, the battery with a battery housing comprises a plurality of individual cells connected in parallel and/or in series according to the invention, which are attached in a prestressed manner to a cooling apparatus using the cell connectors.

With known batteries with head cooling, the individual cells are usually respectively connected to the cooling apparatus via forces acting upon pole contacts. In contrast, exemplary embodiments of the present invention provide that the individual cells can be attached to the cooling apparatus via a connection that can be prestressed of the individual cells arranged on or in pole contacts of the individual cells in a form-fit and force-fit manner and thus to cell connectors supported thereon. The individual cells are in particular pressed to the cooling apparatus via the prestressable cell connectors to the cooling apparatus, e.g., to an underside of the cooling apparatus. The pulling force to be applied for this is thereby introduced into the individual cells via the cell connectors, so that the pole contacts are relieved mechanically. Using the direct pressing of the individual cells to the cooling apparatus, the cooling of the individual cells and the stability of the cell compound of the individual cells are improved. A durable pre-stressing is additionally effected in the pressing compound of the cooling apparatus and the individual cells over the lifetime of the battery.

In one aspect of the present invention, the cell connectors are formed elastically, in particular resiliently, for a prestressable connection of individual cells and cooling apparatus. Such an arrangement of the prestressable connection has the advantage that the pre-stressing can be adjusted individually for each individual cell by corresponding tightening of the cell connectors e.g., using a screw. Differences of the dimensions of the individual cells caused by manufacture can thereby be compensated for in a particular advantageous manner.

In one aspect of the present invention, the cell connectors have an omega-shaped or loop-shaped longitudinal section. Thereby, the height of the pre-stressing is determined by the distance of the omega legs to the o-shaped or the circular omega element and the height of the hollow space of the o-shaped or the circular omega element. The cell connectors are, for example, arranged in such a manner on the pole contacts that that they depict an omega standing on its head in the longitudinal section of the battery, whose omega legs are attached to the pole contacts of adjacent individual cells and whose circular omega element abuts the face side of the individual cells in a form-fit manner and in a force-fit manner in the assembled state.

The height of the cell connectors is furthermore conveniently larger than the height of the pole contacts of the respective individual cell projecting from the cooling apparatus. During the assembly of the cell connectors to the pole contacts of the individual cells, the cell connectors are pre-stressed in such a manner that they press the cooling apparatus against the compound of the individual cells in an advantageous manner and thereby produce an improved heat-conducting contact between the cooling apparatus and the cell compound.

Using the contact of the cell connectors to the cooling apparatus, a part of the lost heat generated in the individual cells is additionally transferred to this cooling apparatus via the pole contacts of the individual cells and via the cell connectors arranged on these, which abut the cooling apparatus.

An alternative aspect of the present invention provides that respectively one cell connector is provided with respectively one spring element. In other words, the cell connector has an additional spring element, which is arranged at the cell connector and which is aligned in the direction of the face sides of the individual cells.

For a simple and fast assembly, the respective, in particular s-shaped spring element can be arranged at and attached to the respective cell connector in a form-fit and force-fit manner, in particular a locking manner.

For the electrical insulation with regard to the cooling apparatus, the respective spring element is formed at least of electrically insulating material, e.g., plastics. The respective spring element is furthermore at least temperature-resistant.

The cooling apparatus is preferably a heat-conducting plate which is heat-conducting contact with the individual cells. This enables a simple and installation space-saving construction of the battery.

Using the elastic formation of the cell connectors, they press the heat-conducting plate against the individual cells in a simple manner.

In a further aspect of the present invention, the cell connectors are in heat-conducting contact with the cooling apparatus formed as heat-conducting plate. In order to further improve the heat conduction and to electrically insulate the cooling apparatus against the cell connectors, an electrically insulating heat-conducting film is present on the cooling apparatus, in particular on the upper side in the direction of the cell connectors, in an advantageous arrangement of the invention.

The cooling apparatus, in particular the heat-conducting plate, conveniently has bores and/or incisions in the region of the pole contacts of the individual cells for passing the pole contacts through. The heat-conducting film conveniently also has recesses for passing the pole contacts through.

Additionally, a heat-conducting and electrically insulating molded body can be arranged between the heat-conducting plate and the individual cells. This serves in particular for the electrical insulation of the pole contacts of an individual cell.

For an optimum heat discharge, the heat-conducting plate can have a channel structure for a coolant flowing through this channel structure. The channel structure is, for example, connected to an air conditioning or cooling cycle of the vehicle, wherein, for example, cooling air or a cooling means of the air conditioning system flows through the channel structure of the heat-conducting plate, so that the lost heat of the individual cells transferred to the heat-conducting plate via the coolant can be discharged from the battery.

Furthermore, the respective individual cell preferably has a honeycomb casing, which also enables an optimized cooling in that the honeycomb casing is preferably formed of an electrically insulating material and which conducts heat in a particularly good manner.

The battery is preferably a vehicle battery, in particular a battery for a vehicle with hybrid drive or a fuel cell vehicle.

BRIEF DESCRIPTION OF THE DRAWING FIGURES

Figure 2:
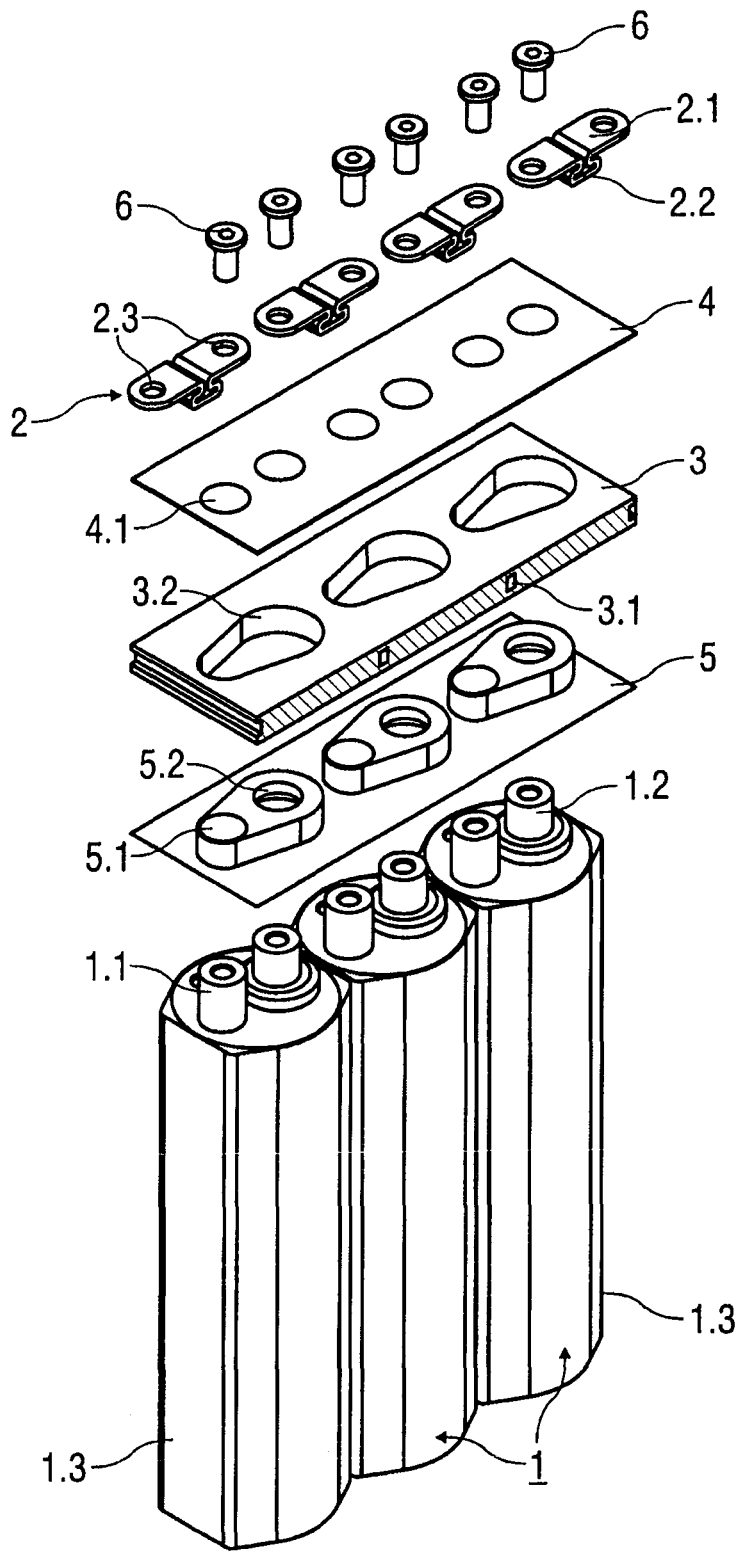
Figure 3:
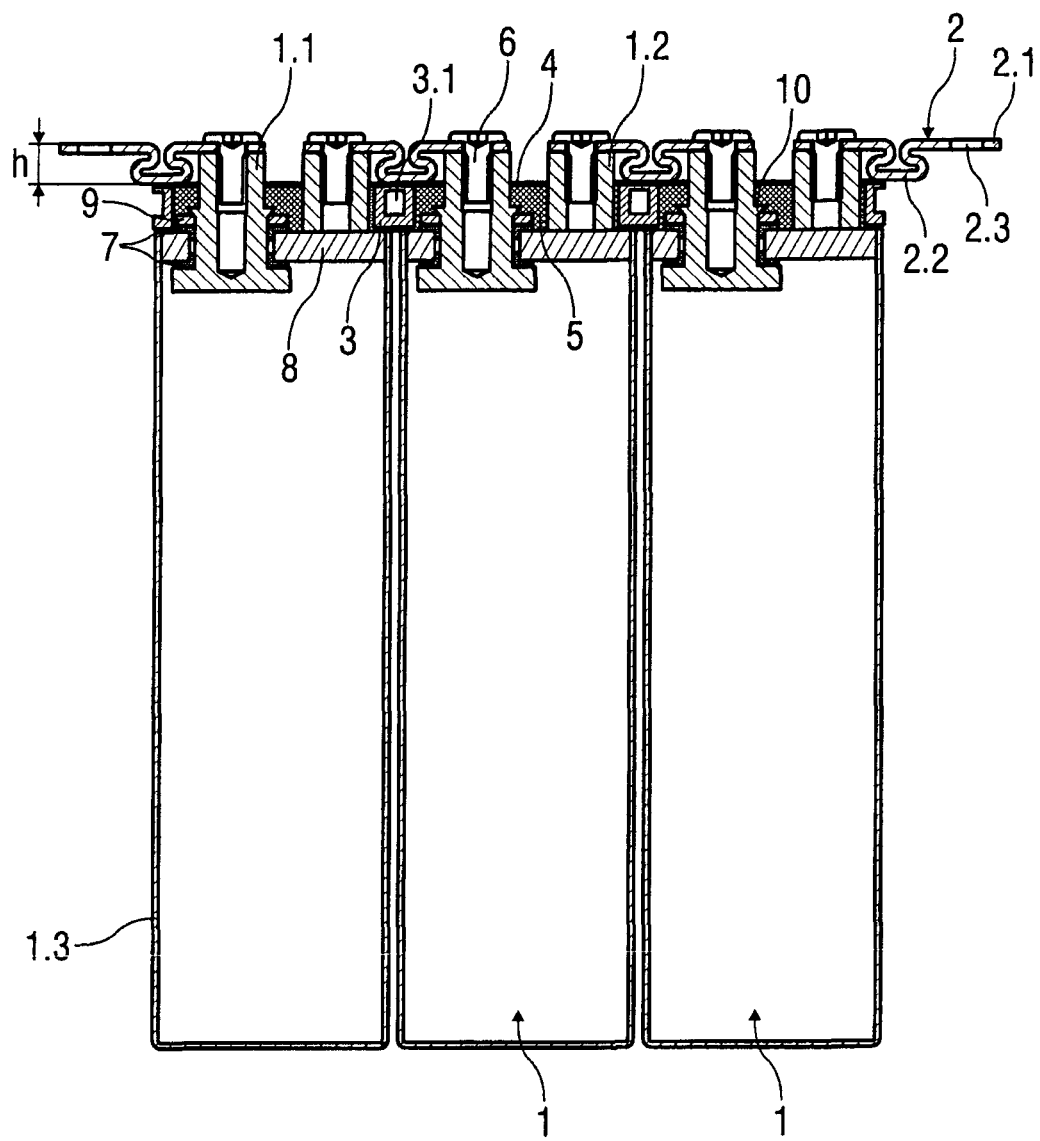
Figure 4:
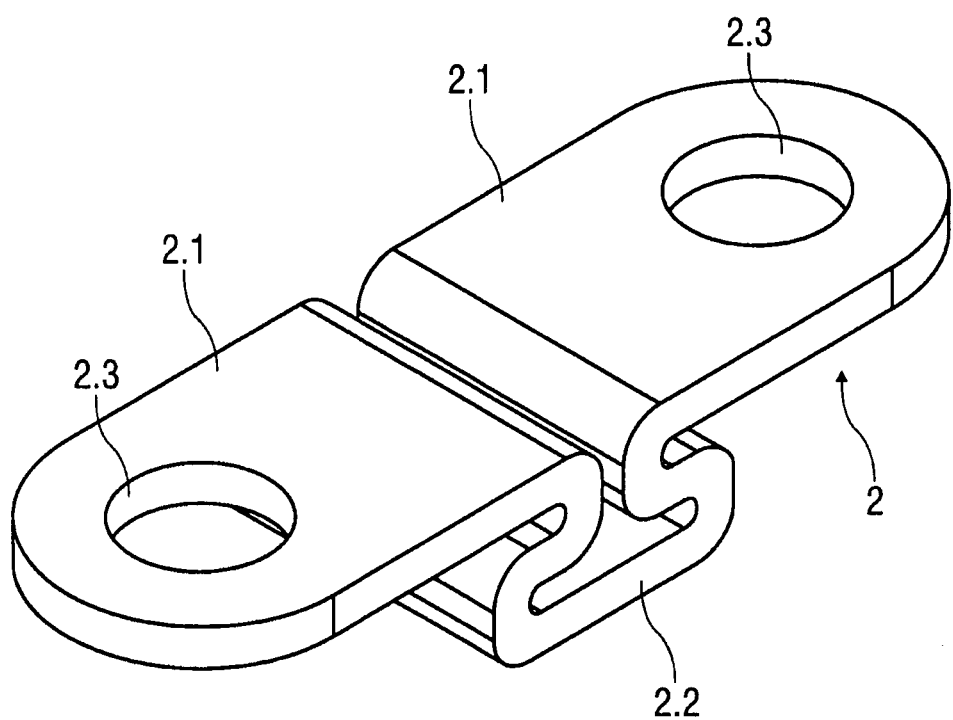
Figure 5:
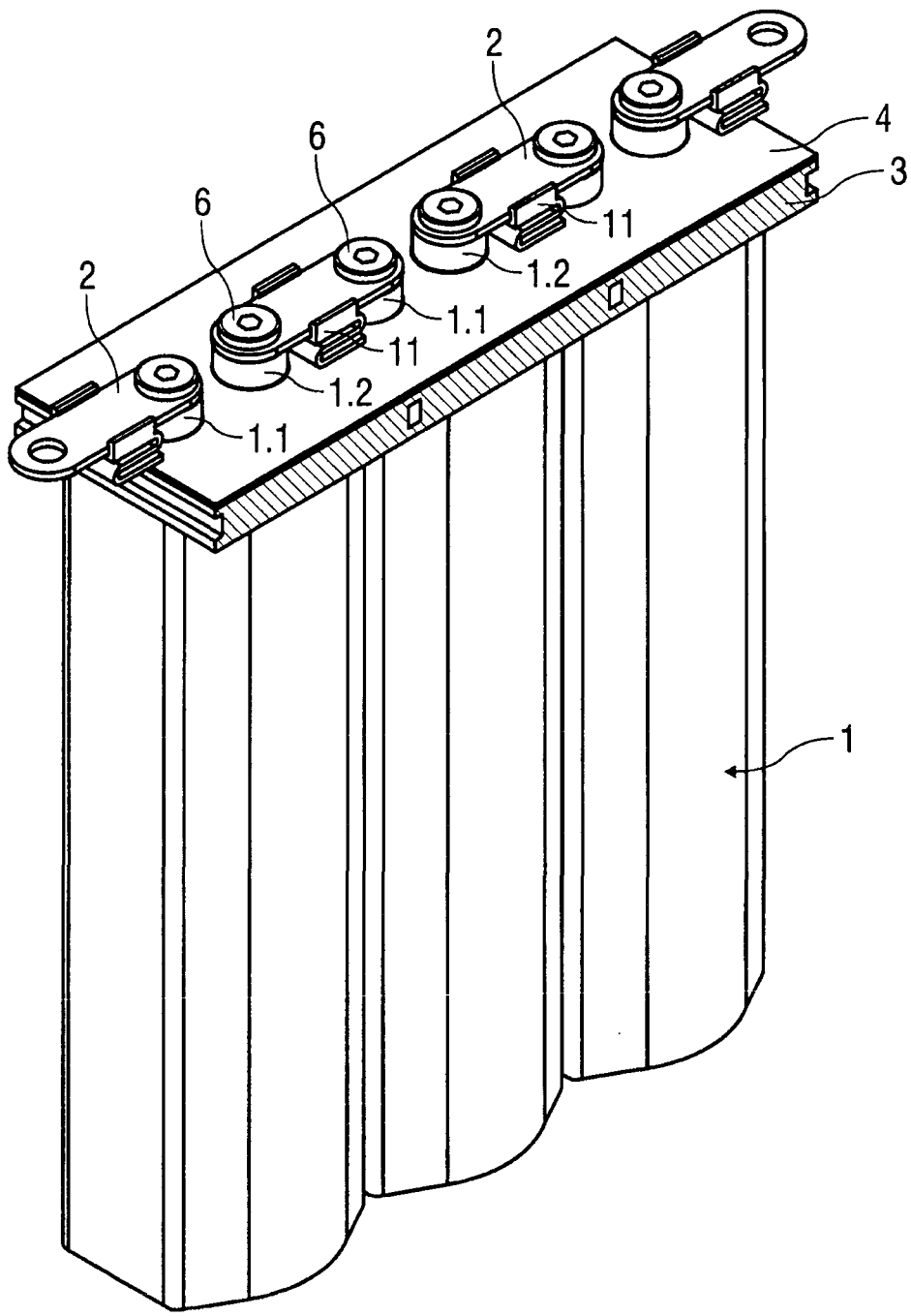
Figure 6:
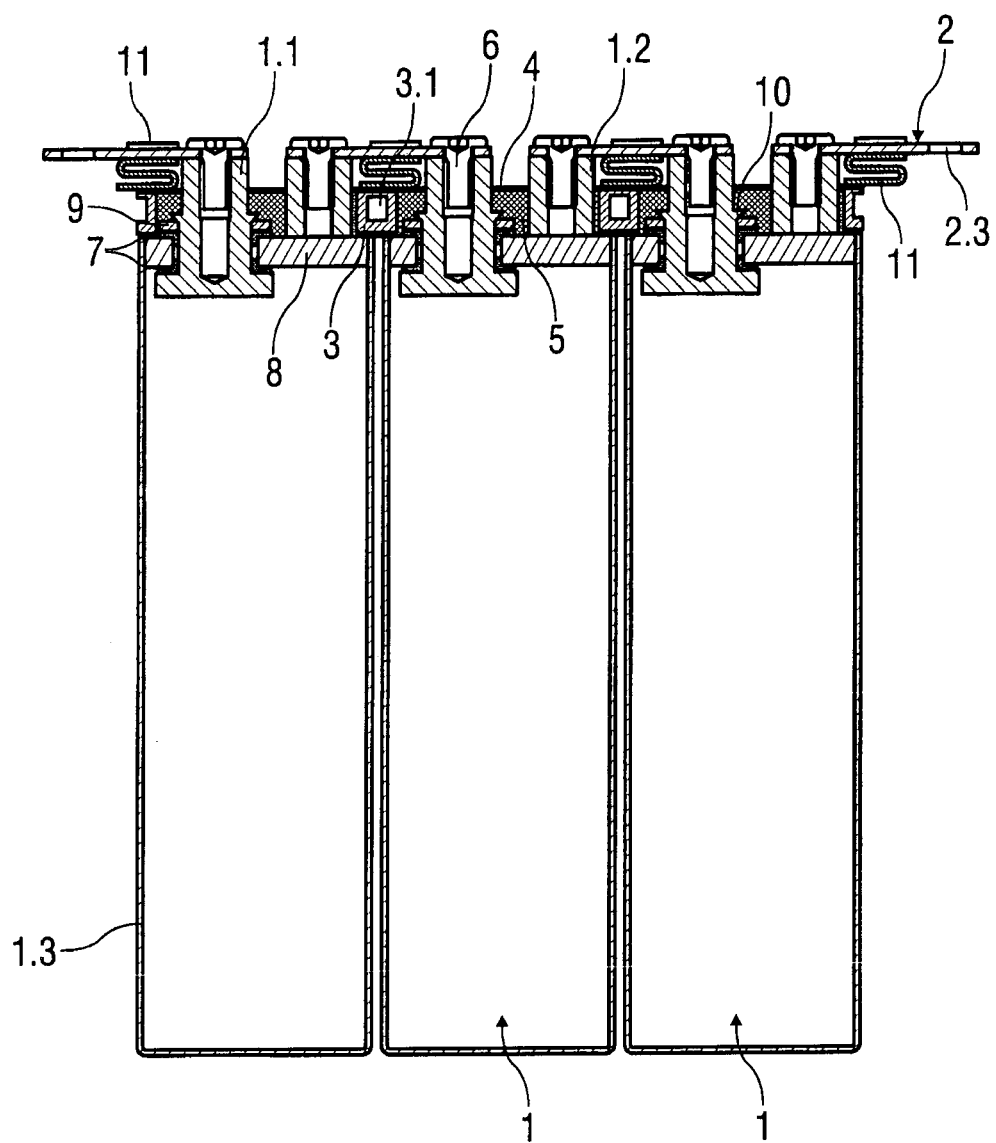
Figure 7:
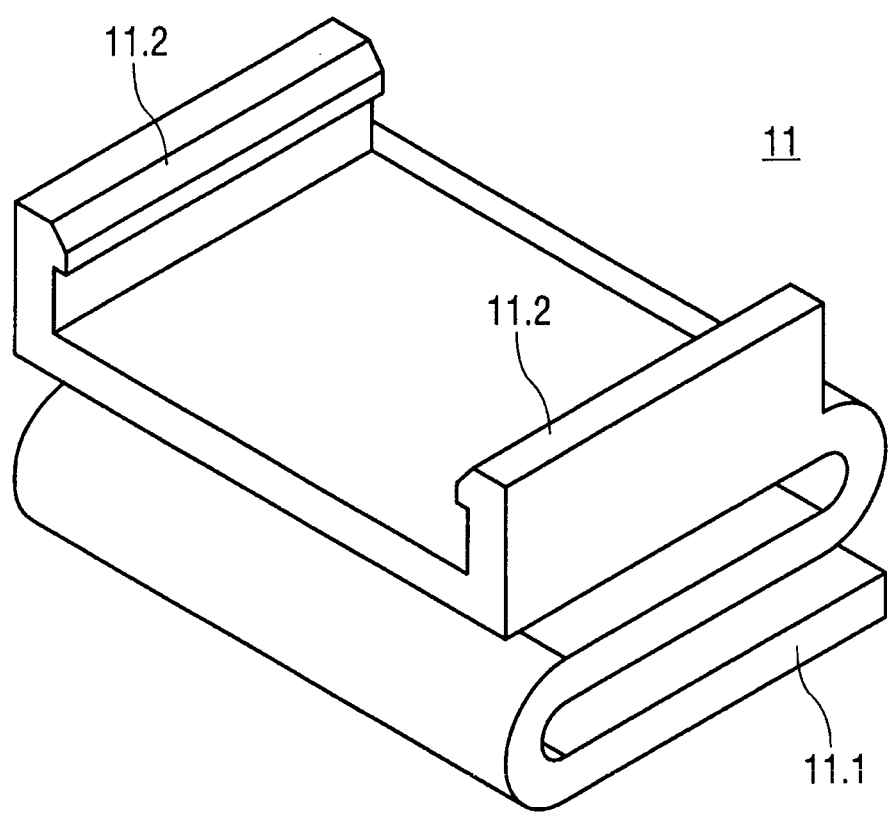

Embodiments of the invention are explained in more detail by means of drawings. It shows thereby:

FIG. 1 schematically illustrates a perspective of a row of individual cells arranged adjacent to each other in parallel, which are attached to a cooling apparatus at their face side in a prestressed manner using omega-shaped cell connectors, FIG. 2 schematically illustrates a further embodiment for a row of individual cells, which are attached to a cooling apparatus at their face side in a prestressed manner using omega-shaped cell connectors in an exploded view, FIG. 3 schematically illustrates the row of individual cells according to FIG. 1 in the longitudinal section, FIG. 4 schematically illustrates an embodiment for an omega-shaped cell connector in perspective, FIG. 5 schematically illustrates an alternative embodiment of the invention in perspective with a row of individual cells arranged adjacent to each other in parallel, which are attached to a cooling apparatus at their face side in a prestressed manner using conventional cell connectors and spring elements which can be arranged on these, FIG. 6 schematically illustrates the row of individual cells according to FIG. 5 in the longitudinal section, and FIG. 7 schematically illustrates an aspect for a spring element, which can be attached to a cell connector, in perspective.

Parts corresponding to each other are provided with the same reference numerals in all figures.

DETAILED DESCRIPTION OF THE DRAWING FIGURES

FIG. 1 schematically shows a perspective of a row of individual cells 1 arranged adjacent to each other in parallel. Thereby, a plurality of these rows of individual cells can be connected to a cell compound, which forms a battery, not shown in detail.

Adjacent individual cells 1 are connected electrically on the pole side in series and/or in parallel using cell connectors 2. For this, each cell connector 2 connects a pole contact 1.1 of the one individual cell 1 to a pole contact 1.2 of the adjacent individual cell 1 in an electrically conducting manner. Depending on the type of connection—in series or in parallel—pole contacts 1.1, 1.1 of the same polarity or pole contacts 1.1, 1.2 of different polarity can thereby be connected to each other.

The individual cells 1 are attached in a prestressed manner to a cooling apparatus 3 for cooling at the face or pole side, in particular pressed. The individual cells 1 are arranged below the cooling apparatus 3 thereon and are connected to each other in an electrically conducting manner above this via the pole contacts 1.1, 1.2 using the cell connectors 2.

The individual cells 1 further respectively have a honeycomb heat-conducting cell housing 1.3, through which heat can be conducted to the cooling apparatus 3.

The pole contacts 1.1, 1.2 of the respective individual cell 1 are thereby guided out through the cooling apparatus 3. Different electrical potentials are applied to the pole contacts 1.1, 1.2 (=plus and minus pole of the individual cell 1).

The cooling apparatus 3 is designed as a heat-conducting plate (also called cooling plate). The cooling apparatus 3 can be provided with a channel structure 3.1, through which a coolant can be guided, e.g., a cooling medium of an air conditioning cycle of an air conditioning system. Via the coolant, the lost heat of the individual cells 1 IS transferred to the cooling apparatus 3, in particular the heat-conducting plate, can be discharged from the battery.

Additionally, a heat-conducting and electrically insulating heat-conducting film 4 can be arranged between the cell connectors 2 and the cooling apparatus. The heat-conducting film 4 can also be formed as a mat.

The cell connectors are formed in an elastic manner for a simple and safe prestressed connection of the individual cells 1 to the cooling apparatus 3. These are preferably formed in a resilient manner.

FIG. 1 illustrates a possible arrangement for elastic cell connectors 2. These are designed in an omega-shaped or loop-shaped manner with lateral omega legs 2.1 and a central circular or o-shaped omega element 2.2. The cell connectors 2 are separate individual elements. Alternatively, these can also be integrated into a so-called cell connector circuit board, into which are, for example, integrated electrical components for a cell voltage monitoring and/or a cell voltage balancing. Using such a cell connector circuit board with an integrated cell connector 2, the assembly is particularly simplified.

Thereby, the strength of the pre-stressing is determined by the distance of the omega legs 2.1 to the o-shaped or the circular omega element 2.1 and the height of the hollow space of the o-shaped or circular omega element 2.2. The cell connectors 2 are, for example, arranged in such a manner on the pole contacts 1.1, 1.2 of adjacent individual cells 1, that they depict an omega standing on its head whose omega legs 2.1 are attached to the pole contacts 1.1, 1.2 of adjacent individual cells 1 and whose circular omega element 2.2 abuts the face side of the adjacent individual cells 1 in a form-fit manner and in the assembled state in a force-fit manner.

The individual cells 1 are attached in a prestressable manner at the cooling apparatus 3 by such an omega shape of the cell connectors 2.

FIG. 2 shows a further aspect for a row of individual cells 1 in an exploded view.

Additionally, a heat-conducting and electrically insulating molded body 5 is arranged between the cooling apparatus 3 and the individual cells 1 in this embodiment. The molded body 5 serves for the electrical insulation of the pole contacts 1.1 and 1.2 of the respective individual cell 1 and has recesses 5.1, 5.2 corresponding to the pole contacts 1.1, 1.2. The molded body 5 extends at least partially into recesses 3.2 of the cooling apparatus 3. The pole contacts 1.1 and 1.2 and attachment elements 6, e.g., screws or rivets, that can be inserted therein, are guided through the recesses 5.1, 5.2 and the recess 3.2.

In the assembled state, and thus for a prestressed connection of the individual cells 1 to the cooling apparatus 3, the attachment element 6 are placed into bores 2.3 of the omega legs 2.1 of the cell connectors 2 and into through-openings 4.1 of the heat-conducting film, into the recess 3.2 of the cooling apparatus 3 and into recesses 5.1, 5.2 of the molded body 5 on the respective pole contacts 1.1, 1.2 and are screwed or clipped together. The pole contacts 1.1, 1.2 correspondingly have an inner thread or inner locking devices for this. By tightening the attachment element 6, e.g., screwing in the screws into the inner thread of the pole contacts 1.1, 1.2, the respective individual cell 1 is pressed to the cooling apparatus 3. Using the omega-shaped cell connectors 2, which are connected to the pole contacts 1.1, 1.2, for example, by screwing, a deformation in the longitudinal axis which is sufficiently elastic and thus a pre-stressing is achieved.

FIG. 3 schematically shows the row of individual cells 1 according to FIG. 2 in a longitudinal section.

A first pole contact 1.1 is thereby electrically insulated from the cell housing 1.4 of the respective individual cell 1, in that it is attached to a cell housing lid 8 via electrically insulating seals 7.

For protecting the seals 7, a washer 9 is arranged above them, which preferably consists of metal. The first pole contact 1.1 is furthermore formed in the shape of a rivet in a region below the washer 9, so that a bulge 10 results that proceeds in an annular manner around the first pole contact 1.1, which bulge rests on the washer 9, so that the first pole contact 1.1 is held securely in the cell housing lid 8.

The second pole contact 1.2 is connected to the cell housing 1.4 and in particular to the cell housing lid 8 in an electrically conductive manner.

As can be seen using this depiction according to FIG. 3, the omega-shaped cell connectors 2 have a larger height h than the height of the pole contacts 1.1, 1.2 of the respective individual cell 1 projecting from the cooling apparatus 3. During the assembly of the cell connectors 2 to the pole contacts 1.1, 1.2, the elastic cell connectors 2 are prestressed in such a manner that they press the cooling apparatus 3 against the compound of individual cells 1 in an advantageous manner and thereby produce an improved heat-conducting contact between the cooling apparatus 3 and the cell compound. This prestressing can additionally also be supported by applying a battery lid, not shown, to the upper side of the cell compound.

FIG. 4 schematically shows an embodiment for an omega-shaped cell connector 2 in detail in perspective. The cell connector 2 has the central circular omega element 2.2, from which proceed the two omega legs 2.1 laterally. Bores 2.3 are introduced into the omega legs 2.1, whose form correspond to the form of the shaft of the attachment element 6 and whose cross sectional surfaces are larger than the cross sectional surface of the shaft of the attachment element 6.

FIG. 5 schematically shows an alternative aspect of the invention in perspective with a row of individual cells 1 arranged in parallel adjacent to each other, whose pole contacts 1.1, 1.2 are connected in an electrically conductive manner at their face side using conventional cell connectors 2', e.g., a simple elongated metal sheet.

For the prestressed connection of the individual cells 1 to the cooling apparatus 3, as described above in more detail using the omega-shaped cell connectors 2, additional spring elements 11 can be arranged at the conventional cell connectors 2'. Depending on the embodiment, the cell connector 2 and the spring element 11 can be separate components. They can alternatively be formed as a molded part.

FIG. 6 schematically shows the row of individual cells 1 according to FIG. 5 in a longitudinal section and FIG. 7 schematically shows an embodiment for such a spring element 11, which can be attached to a cell connector 2', in a perspective depiction.

The spring element 11 comprises an elastic profile structure 11.1 in the longitudinal extension, e.g., an s-shaped profile structure. This elastic profile structure 11.1 enables the above-described prestressed connection of the individual cells 1 to the cooling apparatus 3. For attaching the spring element 11 to the cell connector 2', the spring element 11 has, for example, locking hooks 11.2 or other suitable releasable mechanism.

The spring element 11 is conveniently formed at least of electrically insulating plastics and preferably of a heat-conducting material and is temperature-resistant.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

1 Individual cell
1.1, 1.2 Pole contacts
1.3 Cell housing
2 Cell connectors
2.1 Omega leg
2.2 Omega element
2.3 Bores 2' Conventional cell connector
3 Cooling apparatus
3.1 Channel structure
3.2 Recess
4 Heat-conducting film
4.1 Through-opening
5 Molded body
5.1 Recess
6 Attachment element
7 Seals
8 Cell housing lid
9 Washer
10 Bulge
11 Spring element
11.1 Profile structure
11.2 Locking hook
h Height of the cell connectors

The invention claimed is:

1. A battery, comprising:
a plurality of individual cells that are connected in parallel or in series with one another by cell connectors, each of the plurality of individual cells having pole contacts and a cell housing;
a cooling apparatus for temperature control of the battery, wherein the cooling apparatus is a heat-conducting plate in physical and heat-conducting contact with each of the individual cells, wherein the pole contacts pass through bores or incisions in the heat-conducting plate, wherein the heat-conducting plate is interposed between the cell connectors and the cell housings of each of the individual cells,
wherein the individual cells are attached to the cooling apparatus such that they are prestressed using the cell connectors,
wherein each of the cell connectors includes an upper portion that engages with one of the pole contacts of one of the plurality of individual cells and a lower portion that presses against a top portion of the heat-conducting plate so that a bottom portion of the heat-conducting plate presses against a top portion of the individual cells,
wherein the lower portion of the cell connectors has an omega-shaped longitudinal section.

2. The battery according to claim 1, wherein the cell connectors are formed in an elastic, resilient manner.

3. The battery according to claim 1, wherein a height of the cell connectors is larger than a height of the pole contacts of the respective individual cell projecting from the cooling apparatus.

4. The battery according to claim 1, wherein the cell connectors are in heat-conducting contact with the heat-conducting plate.

5. The battery according to claim 1, wherein an electrically insulating heat-conducting film is arranged between the cell connectors and the heat conducting plate.

6. The battery according to claim 5, wherein the heat-conducting film has recesses for passing the pole contacts through.

7. The battery according to claim 1, wherein a heat-conducting and electrically insulating molded body is arranged between the heat-conducting plate and the individual cells.

8. The battery according to claim 1, wherein the heat-conducting plate has a coolant channel structure.

9. The battery according to claim 1, wherein the cell housing of each of the individual cells has a honeycomb shape.

10. The battery according to claim 1, wherein the battery is a vehicle battery for a vehicle with a hybrid drive or a vehicle operated with fuel cells.

11. A battery, comprising:
a plurality of individual cells that are connected in parallel or in series with one another by cell connectors, each of the plurality of individual cells having pole contacts and a cell housing;
a cooling apparatus for temperature control of the battery, wherein the cooling apparatus is a heat-conducting plate in physical and heat-conducting contact with each of the individual cells, wherein the pole contacts pass through bores or incisions in the heat-conducting plate, wherein the heat-conducting plate is interposed between the cell connectors and the cell housings of each of the individual cells,
wherein the individual cells are attached to the cooling apparatus such that they are prestressed using the cell connectors,
wherein each of the cell connectors is provided with a spring element,
wherein an upper portion of each of the cell connectors engages with one of the pole contacts of one of the plurality of individual cells, the spring element is interposed between the upper portion of the cell connectors and the heat-conducting plate, and a lower portion of the spring element presses against a top portion of the heat-conducting plate so that a bottom portion of the heat-conducting plate presses against a top portion of the individual cells,
wherein the spring element is an s-shaped spring element that is applied to the corresponding cell connector in a form-fit and force-fit, locking manner.

12. The battery according to claim 11, wherein the respective spring element is formed at least of electrically insulating plastics.

13. The battery according to claim 11, wherein the cell connectors are in heat-conducting contact with the heat-conducting plate.

14. The battery according to claim 11, wherein an electrically insulating heat-conducting film is arranged between the cell connectors and the heat conducting plate.

15. The battery according to claim 14, wherein the heat-conducting film has recesses for passing the pole contacts through.

16. The battery according to claim 11, wherein a heat-conducting and electrically insulating molded body is arranged between the heat-conducting plate and the individual cells.

17. The battery according to claim 11, wherein the heat-conducting plate has a coolant channel structure.

18. The battery according to claim 11, wherein the cell housing of each of the individual cells has a honeycomb shape.

* * * * *